Patented Feb. 28, 1939

2,148,601

UNITED STATES PATENT OFFICE 2,148,601

COMPOSITION OF MATTER

Edmond H. Bucy, Stamford, Conn., assignor to Atlas Powder Company, Wilmington, Del., a corporation of Delaware No Drawing. Application December 2, 1936, Serial No. 113,832

7 Claims. (Cl. 260—13)

This invention relates to coating compositions having improved properties, and more particularly to such compositions which are made up of resins, oils, solvents and a cellulose ether combined in such a manner that they are completely compatible with each other both in the body of the coating composition and in the resulting film.

Heretofore there have been used numerous bases for coating compositions. A number of these have been natural resins of fossil origin dissolved in a drying oil and thinned with suitable solvents. More recently the synthetic resins have been used in place of the natural resins in the resin varnishes or solutions. Of these, two types have found considerable favor, namely, the phenol-aldehyde resins and the "alkyd" resins made by reacting polybasic acids with polyhydric alcohols. Still more recently, coating compositions made up of these two types of synthetic resins modified during the course of manufacture with various drying and non-drying oils such as China-wood oil, perilla oil, linseed oil, etc., with drying oil, fatty acids, resins or resin acids, have been utilized as finishing materials. However, all of these materials have been characterized by defects. In general, they are too slow-drying, or if their drying time is reduced, they produce films which are not durable.

It has also been proposed to incorporate a water insoluble cellulose ether such as ethyl cellulose into the aforementioned resin solutions or resin varnish by dissolving the cellulose ether in a suitable solvent and adding the resulting solution to the resin solution. This procedure necessitates the use of a sufficiently strong solvent in the resin varnish or solution to allow the incorporation of the cellulose ether solution. For example, petroleum naphtha which is a common varnish solvent, cannot be used where it is desired to incorporate a cellulose ether in the varnish or resin solution, since it is not a solvent for water-insoluble cellulose ethers such as ethyl cellulose, and if petroleum naphtha is present, the mixture of varnish and cellulose ether will not be clear and the resin and cellulose ether are not made compatible so that such compositions are unsuitable for use as coating compositions.

The use of a strong solvent in the resin solution to obtain complete compatibility when the cellulose ether is added is disadvantageous since such solvents are usually either aromatic, oxygenated or halogenated, such as toluol, xylol, benzol, ethyl acetate, butyl acetate, ethyl alcohol, methyl ethyl ketone, halogenated hydrocarbons, etc. and are usualy more expensive than such solvents as petroleum naphtha, hydrogenated petroleum hydrocarbons, etc.

Moreover, such prior coating compositions have other disadvantages since even if complete compatibility in solution between the cellulose ether and the resin is obtained as by the use of a solvent or solvent mixture in which both are soluble, the resulting films are frequently cloudy or dull or lack durability, or are hard to rub to a good finish.

The principal object of this invention is to provide a coating composition having new and improved properties compared with many of the prior coating compositions referred to above.

Another object of this invention is to provide a new method of introducing a water-insoluble cellulose ether, such as ethyl cellulose, into resinous mixtures or varnishes, whereby the disadvantages of many of the prior mixtures comprising resins and cellulose ethers are overcome.

Another object of this invention is to provide a new coating composition comprising a resinous mixture in which water-insoluble cellulose ether is dissolved, which yields films of high durability, improved drying time and better appearance.

Other objects will more fully hereinafter appear.

This invention provides a method of incorporating a water-insoluble cellulose ether into resinous mixtures or varnishes in such a manner that the resin and ethyl cellulose are completely compatible in the mixture, in the mixture when diluted with solvents in which the cellulose ether was not previously soluble, and in the resulting film. Coating compositions made according to this invention show a greatly improved drying time and give films which rub more easily, have a more brilliant appearance, and are more durable.

In the practice of this invention, a resin or mixture of resins and an oil are first cooked together. As the resin ingredient, there may be used any suitable oil-soluble varnish resin, such as a phenol modified natural resin, such as rosin or copal esterified with phenol, such as that known as Phenac 615 or Beckapol, ester gum, a resin acid modified alkyd resin such as glycerine phthalic anhydride resin modified with rosin, phenol formaldehyde resin modified with drying oil, drying oil fatty acid or resin acid, drying oil or drying oil fatty acid modified alkyd resins, any type of "oil soluble" resin such as the oil-soluble and oil reactive phenol formaldehyde resin known as Super Beckacite 2000, or any other oil-soluble phenol formaldehyde resin such as the oil-soluble cresol-formaldehyde, p-hydroxy diphenyl-formaldehyde, xylenol-formaldehyde, alkylated phenol-formaldehydes, fossil resin such as copal, etc. The above list is intended as illustrative only of the fact that any resin which is soluble in oil to the extent of forming a varnish therewith upon cooking is usable, and is not intended as limiting.

As the oil ingredient, there may be used any drying, semi-drying or non-drying oil of the glyceride type, as for example, drying oils such as raw China-wood oil, bodied China-wood or linseed oil, raw linseed oil, oilica oil, poppy oil, soya bean oil, semi-drying oils such as corn oil, cottonseed oil, sesame oil, rapeseed oil, non-drying oils such as castor oil, olive oil, etc.

The resin and oil are heated together to a temperature of about 500° F. or higher and allowed to react with each other and to body when the water-insoluble cellulose ether is added and the mixture is allowed to cool to 350 or 400° F. and then is thinned back with a suitable solvent. It is important that the mixture of resin and oil be not allowed to cook too long before the cellulose ether is added, for if the oil is allowed to polymerize and react more completely, the cellulose ether is difficultly soluble and may not go into solution at all. On the other hand, if the mixture of resin and oil is not cooked sufficiently to allow reaction and bodying before the cellulose ether is added, the resulting mixture of resin, oil and cellulose ether should not be held at high temperatures (over 540° F.) for reaction and body since this produces disadvantageous results. The preferred procedure is to hold the resin and oil mixture at a cooking and bodying temperature for a period of time sufficient to produce a mixture of correct body, then to add the cellulose ether and to immediately cool to about 450° F., or preferably to 400° F. or 350° F., whereupon a thinner and suitable driers are added.

By the above procedure it has been discovered that the water-insoluble cellulose ether goes into solution almost immediately and remains in solution upon cooling and upon thinning even with solvents in which it is not soluble by itself.

As the cellulose ether, it is preferred to use ethyl cellulose which may be of either low or high viscosity, and the ethoxy content of which may vary from 40 to 50% or within even wider limits. Other water-insoluble cellulose ethers such as propyl, isopropyl, n-butyl, isobutyl, and ethyl benzyl cellulose may be used. Mixtures of two or more water-insoluble cellulose ethers may be used.

As the solvents, there may be used hydrogenated petroleum naphtha or mixtures of petroleum naphtha and hydrogenated petroleum naphtha. There may be used toluol, xylol, ethyl acetate, butyl acetate, ethyl alcohol, butyl alcohol, methyl ethyl ketone, or mixtures of these with each other, or mixtures of these with petroleum naphtha or hydrogenated petroleum naphtha. Hydrogenated petroleum naphtha and its mixtures with petroleum naphtha are preferred, however, for reasons of economy. They are not when used alone normal solvents for ethyl cellulose, but are unexpectedly, solvents for the mixtures of resin and ethyl cellulose produced by this invention.

The films produced from the coating composition of this invention are very brilliant, quick-drying, easy-rubbing, tack-free and durable. They do not become cloudy upon ageing as is the case with many mixtures in which compatibility of the resin and cellulose ether is obtained by the use of mutual solvents. They are much superior also to simple mixtures of cellulose ethers and compatible resin produced in the usual methods.

The cellulose ether dissolves more easily in the above procedure when it is added to the mix having a temperature above 525° F., but it may be added at lower temperatures if mechanical stirring is used.

When soya oil is used, the cellulose ether dissolves much more easily than when linseed or China-wood oils are employed. The reason for this is not known but it may be that the higher percentage of glycerides in soya oil react with or dissolve the cellulose ether better.

The proportions of the various ingredients may vary over wide limits. The ratio of resin to oil will vary depending upon their types, and may vary from enough oil to produce an oil varnish upon cooling to that quantity which is only enough to react or dissolve the resin at cooking temperatures but which produces a plastic or even a solid mass upon cooling to room temperatures. The quantity of oil and resin used should be sufficient to dissolve the cellulose ether under the conditions above outlined. In general, the proportions by weight of the non-volatile ingredients, excluding the drier, will vary as follows. The proportion of resin will vary from 50 to 65%, although it may vary over a still greater range, as from 30 to 80%. The proportion of oil will preferably vary from 25 to 40%, although slightly wider limits may be used. It is preferred to use such a proportion of oil that the resulting coating composition contains more of the resin and cellulose ether than of oil, although this is not essential. The proportion of cellulose ether will usually be in the neighborhood of 8 to 10%, although greater or smaller percentages may be used. Usually there will be present a preponderance of resin, a lesser amount of oil and a still lesser amount of cellulose ether.

The amount of volatile solvents added to thin the resulting composition is preferably such that the final coating composition contains about 30% of solids, i. e. non-volatile ingredients, by weight. However, this figure may be varied between wide limits such as, for example, from 20 to 90% solids. However, the figure of 30% is preferred since it gives a sufficiently low viscosity while at the same time it does not entail too great an expense in solvent loss which will cause undue expense in solvent recovery. The amount and type of drier will vary with the amount and type of oil present. The drier which is preferred is cobalt naphthenate, such as that known as Cobalt Nuodex, which may be used in amounts from 0.2 to 0.4 per cent based on the total non-volatiles present. Other driers may be used, however, such as equivalent proportions of other metal naphthenates, etc. The kind and proportion of drier will be within the skill of the ordinary worker in the art.

Below are given several specific examples showing preferred modes of carrying the invention into practice. These examples are not to be taken as limiting, however, but merely as illustrative. Other and equivalent materials and procedures may be employed without departing from the spirit of the invention which is to be limited only as defined in the appended claims. Thus, if desired, small amounts of polybasic acids or polyhydric alcohols may be added during the reaction to modify the characteristics of the final finish. In the examples, Phenac 615 is a phenol modified rosin, ester gum is an abietic glyceride, Rezyl 408 is a resin-modified phthalic glyceride synthetic resin, Amberol 801 and K-12-A are resin modified phenol formaldehyde resins. Beckacite 2000 is an oil-soluble and oil reactive modified phenol formaldehyde. Run Congo is a fossil congo which has been preheated or "run", using a regular varnish cooking procedure. 1700 Gum is a resin modified alkyd resin. The hydrogenated petroleum naphtha is that known as Solvesso #2.

Example 1

|  | Grams | Percent total solids |
|---|---|---|
| Phenac 615 | 335 | 41.9 |
| Ester gum | 112 | 14.0 |
| Raw China-wood oil | 280 | 35.0 |
| Ethyl cellulose | 72.5 | 9.0 |

The Phenac 615, ester gum and raw China-wood oil are brought to 530° F. in 2½ hours, and held at that temperature for 3 minutes. Then the ethyl cellulose is added with vigorous agitation, whereupon it is dissolved. The hot mixture is then cooled to 460° F., and 5 c.c. of Cobalt Nuodex are added with agitation. The mixture is then cooled to 400° F. and thinned with hydrogenated petroleum naphtha under a reflux condenser to avoid undue loss of solvent by evaporation, to a total solids content of 29%. The resulting coating composition has a viscosity of 82 c. p., a specific gravity of .873 at 26° C., and dries overnight to a hard non-tacky film.

Example 2

|  | Grams | Percent total solids |
|---|---|---|
| Phenac 615 | 342 | 38.0 |
| Ester gum | 147 | 16.3 |
| Raw castor oil | 313 | 34.8 |
| Ethyl cellulose | 98 | 10.9 |

The Phenac 615, ester gum and raw castor oil are brought to 500° F. in 3 hours. The batch is then cooled to 470° F. and held there 1½ hours. The ethyl cellulose is then added with agitation, after which 5 c.c. of Cobalt Nuodex are added, also with agitation. The batch is then cooled to 400° F. and thinned with hydrogenated petroleum naphtha, to a total solids content of 33.5%. The resulting coating composition has a viscosity of 65 c.p., and a specific gravity of .873 at 28° C.

Example 3

|  | Grams | Percent total solids |
|---|---|---|
| 1700 gum | 565 | 62.4 |
| Raw China-wood oil | 261 | 28.7 |
| Ethyl cellulose | 83 | 9.1 |

The 1700 gum and raw China-wood oil are brought to 520° F. in 2 hours. The ethyl cellulose is then added with agitation. The batch is then cooled to 440° F. and 5 c.c. of Cobalt Nuodex are added with agitation. The batch is then cooled to 400° F. and thinned with hydrogenated petroleum naphtha to a total solids content of 29.8%. The resulting coating composition has a viscosity of 50 c.p. and a specific gravity of .919 at 28° C.

Example 4

|  | Grams | Percent total solids |
|---|---|---|
| Rezyl 408 | 314 | 29.8 |
| Amberol 801 | 100 | 9.4 |
| Beckacite 2000 | 157 | 14.9 |
| Raw China-wood oil | 300 | 28.4 |
| Bodied linseed oil | 100 | 9.4 |
| Ethyl cellulose | 85 | 8.0 |

The Beckacite 2000 and raw China-wood oil are taken to 560° F., then checked with the bodied linseed oil. The batch is held at 525° F. for 10 minutes, when the Amberol 801 and Rezyl 408 are added. After they are dissolved, the ethyl cellulose is added and the batch is held at 500° F. until the solution is brilliant (for from 45 minutes to 1 hour). The batch is then cooled to 400° F., 5 c.c. of Cobalt Nuodex are stirred in and the batch is thinned to 30.1% total solids. The coating composition obtained has a viscosity of 69 c.p. at 26° C.

Example 5

|  | Grams | Percent total solids |
|---|---|---|
| Rezyl 408 | 314 | 29.8 |
| Amberol 801 | 100 | 9.4 |
| Beckacite 2000 | 157 | 14.9 |
| Raw soya bean oil | 400 | 37.8 |
| Ethyl cellulose | 85 | 8.0 |

The soya bean oil and Beckacite 2000 are carried to 560° F. in approximately 1¼ hours, and held at this temperature for 10 minutes, when the Amberol 801 and Rezyl 408 are added. The batch is held at 530° F. for 2 hours, whereupon the ethyl cellulose is added. The batch is then cooled to 400° F. and 7 c.c. of Cobalt Nuodex are added, followed by thinning with hydrogenated petroleum naphtha to a total solids content of 29.8%. The resulting coating composition has a viscosity of 62 c.p. and a specific gravity of .90 at 26° C.

Example 6

|  | Grams | Percent total solids |
|---|---|---|
| Ester gum | 85.5 | 10.7 |
| Beckacite 2000 | 342 | 42.7 |
| Raw China-wood oil | 302 | 37.6 |
| Ethyl cellulose | 72.6 | 9.1 |

The Beckacite 2000, ester gum and approximately ⅔ of the raw China-wood oil are taken to 560° F. in one hour, the balance of the oil is then added; and the batch is heated to 525° F. in 15 minutes, at which temperature it is held for 45 minutes. The ethyl cellulose is then added with agitation. The batch is cooled to 400° F., 5 c. c. of Cobalt Nuodex are added and the mixture is thinned to a total solids content of 29.3% with hydrogenated petroleum naphtha. The product has a viscosity of 58 c. p. and a specific gravity of .860 at 26° C.

Example 7

|  | Grams | Percent total solids |
|---|---|---|
| Ester gum | 85.5 | 10.7 |
| Beckacite 2000 | 342 | 42.7 |
| Raw soya bean oil | 302 | 37.6 |
| Ethyl cellulose | 72.6 | 9.1 |

The Beckacite 2000, ester gum and approximately ⅔ of the raw soya bean oil are brought to 560° F. in 45 minutes, and held at this temperature for 10 minutes. The balance of the oil is then added and the batch is heated to 540° F. at which temperature it is held for 1½ hours. The ethyl cellulose is added and the batch cooled to 400° F., whereupon 7.25 grams of Cobalt Nuodex are added and the mass is thinned with hydrogenated petroleum naphtha to a total solids content of 29.7%. The product has a viscosity of 42 c. p. and a specific gravity of .859 at 26° C.

Example 8

|  | Grams | Percent total solids |
|---|---|---|
| Run Congo | 500 | 51.0 |
| Raw China-wood oil | 392 | 39.8 |
| Ethyl cellulose | 89.25 | 9.1 |

The run Congo and approximately ¾ of the raw China-wood oil are brought to 560° F. and held there for 5 minutes. The balance of the oil is then added and the batch is held at 525° for 15 minutes. The ethyl cellulose is then added. As soon as it is dissolved, the batch is cooled to 400° F., when 5 c. c. of Cobalt Nuodex are added and then the batch is thinned with hydrogenated petroleum naphtha to a total solids content of 28.0%. The product has a viscosity of 62 c. p. and a specific gravity of .901 at 26° C.

Example 9

|  | Grams | Percent total solids |
|---|---|---|
| Run Congo | 500 | 51.0 |
| Raw soya bean oil | 392 | 39.8 |
| Ethyl cellulose | 89.25 | 9.1 |

The run Congo and approximately ¾ of the raw soya bean oil are brought to 560° F. and held there for 5 minutes. The balance of the oil is then added and the batch is held at 540° F. for 1 hour. The ethyl cellulose is then added and the batch is cooled to 400° F., whereupon 7 c. c. of Cobalt Nuodex are added, followed by thinning to a total solids content of 30.1% with hydrogenated petroleum naphtha. The product has a viscosity of 52 c. p. and a specific gravity of .895 at 27° C.

Example 10

|  | Grams | Percent total solids |
|---|---|---|
| Amberol K-12-A | 270 | 30.0 |
| Kopol 502 | 253 | 28.1 |
| Amberol 801 | 63 | 7.0 |
| Kettle bodied linseed oil | 54 | 6.0 |
| Blown China-wood oil | 180 | 20.0 |
| Ethyl cellulose | 63 | 7.0 |
| Cobalt Nuodex drier | 20 | 2.0 |

Kopol 502 is Congo copal modified slightly with ester gum.

The resins and oils are commingled together and heated to 400° F. in 50 minutes. Since the batch foams at this point, mechanical stirring or bubbling of carbon dioxide through the batch is necessary. The batch is then carried to 545° F. in 20 minutes, the heat is turned off and the batch allowed to cool to 520° F. in 20 minutes. Heat is applied and part of the ethyl cellulose is added. When the foam caused by this addition subsides, the remainder of the ethyl cellulose is added, whereupon the heat is turned off and the batch is cooled to 450° F. The Cobalt Nuodex is then added. The batch is cooled to 400° F. and thinned to a total solids content of 60% with hydrogenated petroleum naphtha. The viscosity of the product is 1640° MacMichael (3240 centipoises) at 25–26° C. Its weight per gallon is 7.71 lbs. The product prints less than that of the foregoing examples, rubs to a good lustre, dries to a dust free film in ½ hour, dries so that a second coat may be applied in one hour and shows no lifting upon application of succeeding coats of the same material.

While the product of this invention will consist essentially of a resin, a glyceride oil and ethyl cellulose reacted together in the manner disclosed and dissolved, if desired, in suitable solvents, other ingredients may be added to the product such as small amounts of synthetic or natural resins, dyes, pigments, additional plasticizers, etc. In some cases the addition of solvents may be dispensed with and the composition made to contain sufficient oil for a vehicle. In other cases, the proportions of oil may be such as to yield a plastic mass which may, upon the addition of suitable fillers, and pigments, be molded into various shapes. In such case, a small amount of solvent may be added to the mass for the more ready incorporation of fillers, etc.

The product of the process described herein is evidently a chemical reaction product since raw materials have been put together in such a manner that strong solvents are not needed to dissolve it whereas the raw materials and particularly the cellulose ether require strong solvents for dissolution.

What I claim is:—

1. The process of producing a composition of matter which comprises heating an unbodied and unreacted mixture consisting essentially of an oil-soluble resin and an oil of the glyceride type to a body temperature, commingling a water-insoluble cellulose ether and said mixture during the bodying reaction, and maintaining the resulting mixture at an elevated temperature in the absence of a mutual solvent until the cellulose ether is dissolved.

2. The process of producing a composition of matter which comprises heating an unbodied and unreacted mixture consisting essentially of an oil-soluble resin and an oil of the glyceride type to a body temperature, commingling a water-insoluble cellulose ether and said mixture during the bodying reaction and at a temperature of approximately 470° F. to 540° F., and maintaining the resulting mixture at an elevated temperature in the absence of a mutual solvent until the cellulose ether is dissolved.

3. The process of producing a composition of matter which comprises heating an unbodied and unreacted mixture consisting essentially of 586 parts by weight of oil-soluble resins, 54 parts by weight of kettle bodied linseed oil, and 180 parts by weight of blown China-wood oil to a temperature of 400° F. in 50 minutes, carrying the batch to 545° F. in 20 minutes, allowing the batch to cool to 510° F. in 20 minutes, then adding 63 parts by weight of ethyl cellulose to the resulting mixture, and maintaining the resulting mixture at an elevated temperature in the absence of a mutual solvent until the cellulose ether is dissolved.

4. A composition of matter produced in accordance with the process of claim 1.

5. A composition of matter produced in accordance with the process of claim 2.

6. A composition of matter produced in accordance with the process of claim 3.

7. A coating composition comprising a film-forming constituent consisting essentially of a composition produced in accordance with the process of claim 1, dissolved in a volatile organic solvent.

EDMOND H. BUCY.

CERTIFICATE OF CORRECTION.

Patent No. 2,148,601.  February 28, 1939.

EDMOND H. BUCY.

It is hereby certified that error appears in the printed specification of the above numbered patent requiring correction as follows: Page 4, second column, lines 32 and 42, claims 1 and 2 respectively, for the word "body" read bodying; and that the said Letters Patent should be read with this correction therein that the same may conform to the record of the case in the Patent Office.

Signed and sealed this 18th day of April, A. D. 1939.

Henry Van Arsdale (Seal)  Acting Commissioner of Patents.